(12) United States Patent
Phan Huy et al.

(10) Patent No.: US 12,107,337 B2
(45) Date of Patent: Oct. 1, 2024

(54) MULTI-ANTENNA WIRELESS COMMUNICATION DEVICE, METHOD FOR CONTROLLING SUCH A DEVICE

(71) Applicant: Orange, Issy-les-Moulineaux (FR)

(72) Inventors: Dinh Thuy Phan Huy, Châtillon (FR); Philippe Ratajczak, Châtillon (FR); Dominique Barthel, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 127 days.

(21) Appl. No.: 17/999,697

(22) PCT Filed: May 12, 2021

(86) PCT No.: PCT/FR2021/050836
§ 371 (c)(1),
(2) Date: Nov. 22, 2022

(87) PCT Pub. No.: WO2021/240091
PCT Pub. Date: Dec. 2, 2021

(65) Prior Publication Data
US 2023/0291126 A1    Sep. 14, 2023

(30) Foreign Application Priority Data

May 26, 2020 (FR) ...................................... 2005546

(51) Int. Cl.
*H01Q 21/28* (2006.01)
*H01Q 3/30* (2006.01)
(Continued)

(52) U.S. Cl.
CPC .............. *H01Q 21/28* (2013.01); *H01Q 3/30* (2013.01); *H04B 7/0617* (2013.01); *H04B 7/086* (2013.01)

(58) Field of Classification Search
None
See application file for complete search history.

(56) References Cited

U.S. PATENT DOCUMENTS

| 3,423,699 A | 1/1969 | Hines |
| 11,367,954 B1 * | 6/2022 | West ...................... H01Q 21/22 |

(Continued)

OTHER PUBLICATIONS

International Search Report and Written Opinion dated Aug. 4, 2021 for Application No. PCT/FR2021/050836.
(Continued)

*Primary Examiner* — Wilson Lee
(74) *Attorney, Agent, or Firm* — Knobbe, Martens, Olson & Bear, LLP

(57) ABSTRACT

A wireless communication device is described, having an analogue-digital hybrid architecture comprising passive phase shifters. The device includes a control module configured to control means for switching the communication device, such that the device is capable of alternating between three separate modes: a first/second mode in which each passive phase shifter is integrated into a transmission/reception chain, and a third mode in which each passive phase shifter is integrated into a transmission line. The transmission line includes a first portion connecting a first port of the passive phase shifter to the elementary antenna to which it can also be connected in the first/second modes and configured such that substantially all the electromagnetic energy associated with a transmission beam received by the elementary antenna is transmitted to the passive phase shifter, and also includes a second portion connecting the second port of the passive phase shifter to an impedance configured to reflect the electromagnetic energy.

9 Claims, 4 Drawing Sheets

(51) Int. Cl.
    *H04B 7/06*           (2006.01)
    *H04B 7/08*           (2006.01)

(56) References Cited

U.S. PATENT DOCUMENTS

| | | | |
|---|---|---|---|
| 2018/0115360 A1* | 4/2018 | Niknejad | H01Q 3/267 |
| 2019/0190147 A1* | 6/2019 | Hallivuori | H01Q 3/38 |
| 2020/0411983 A1* | 12/2020 | Sano | H01Q 3/40 |
| 2021/0135721 A1* | 5/2021 | Lopez | H03F 3/608 |
| 2022/0216909 A1* | 7/2022 | Bengtsson | H04B 7/145 |
| 2023/0155286 A1* | 5/2023 | Rexberg | H01Q 3/36 |
| | | | 343/702 |

OTHER PUBLICATIONS

Taha Abdelrahman et al. "Deep Learning for Large Intelligent Surfaces in Millimeter Wave and Massive MIMO Systems" 2019 IEEE Global Communications Conference (Globecom), IEEE, Dec. 9, 2019 (Dec. 9, 2019), pp. 1-6.

\* cited by examiner

[Fig. 1]
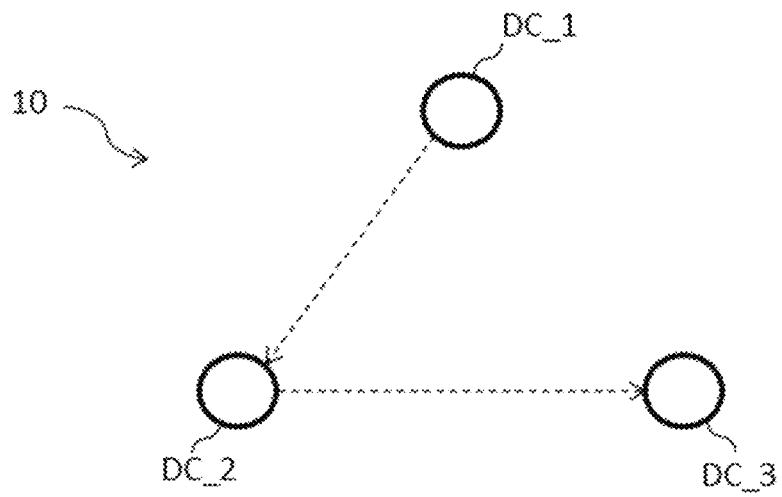
[Fig. 3]
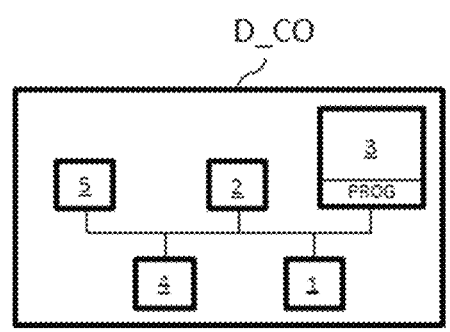

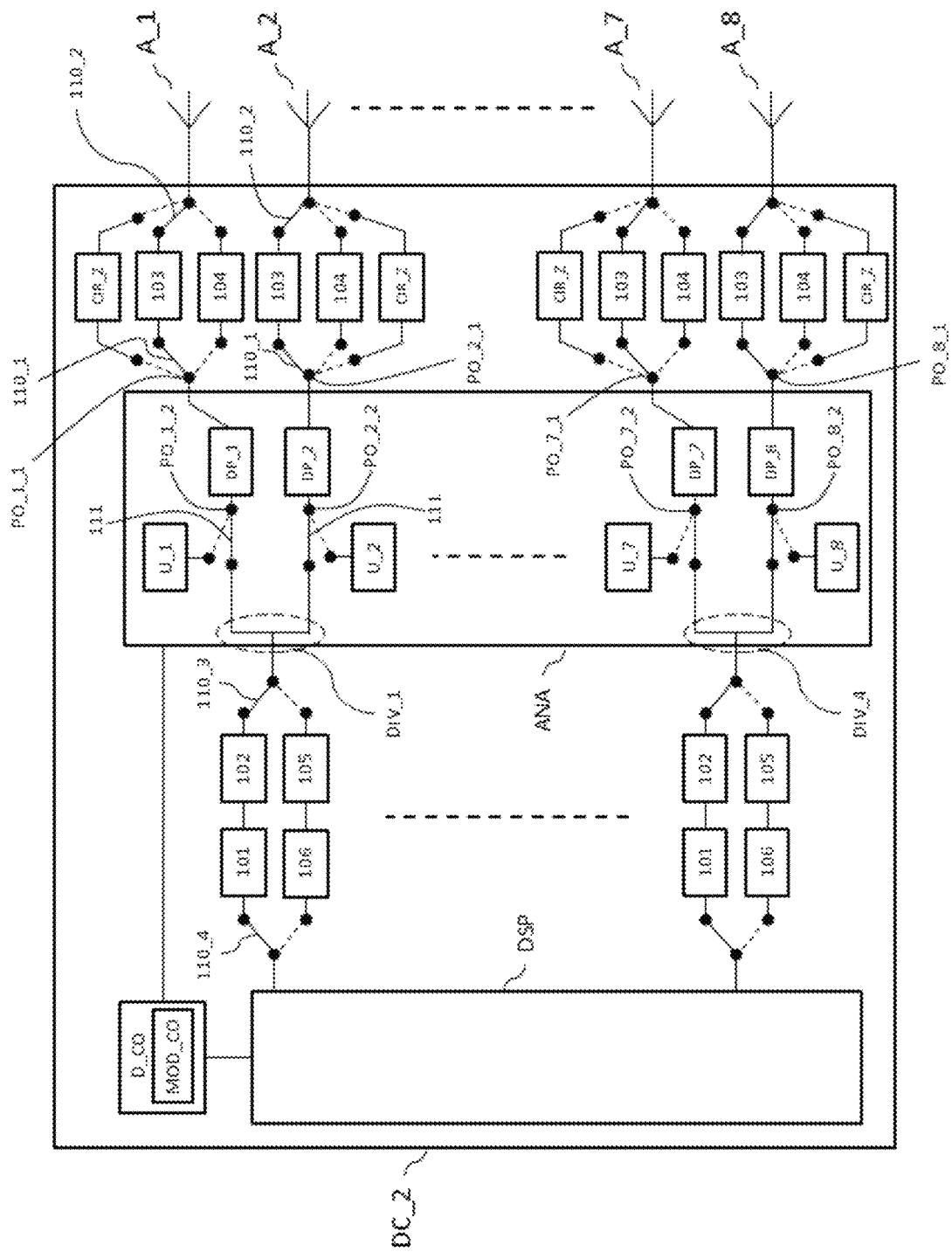
[Fig. 2]

[Fig. 4]
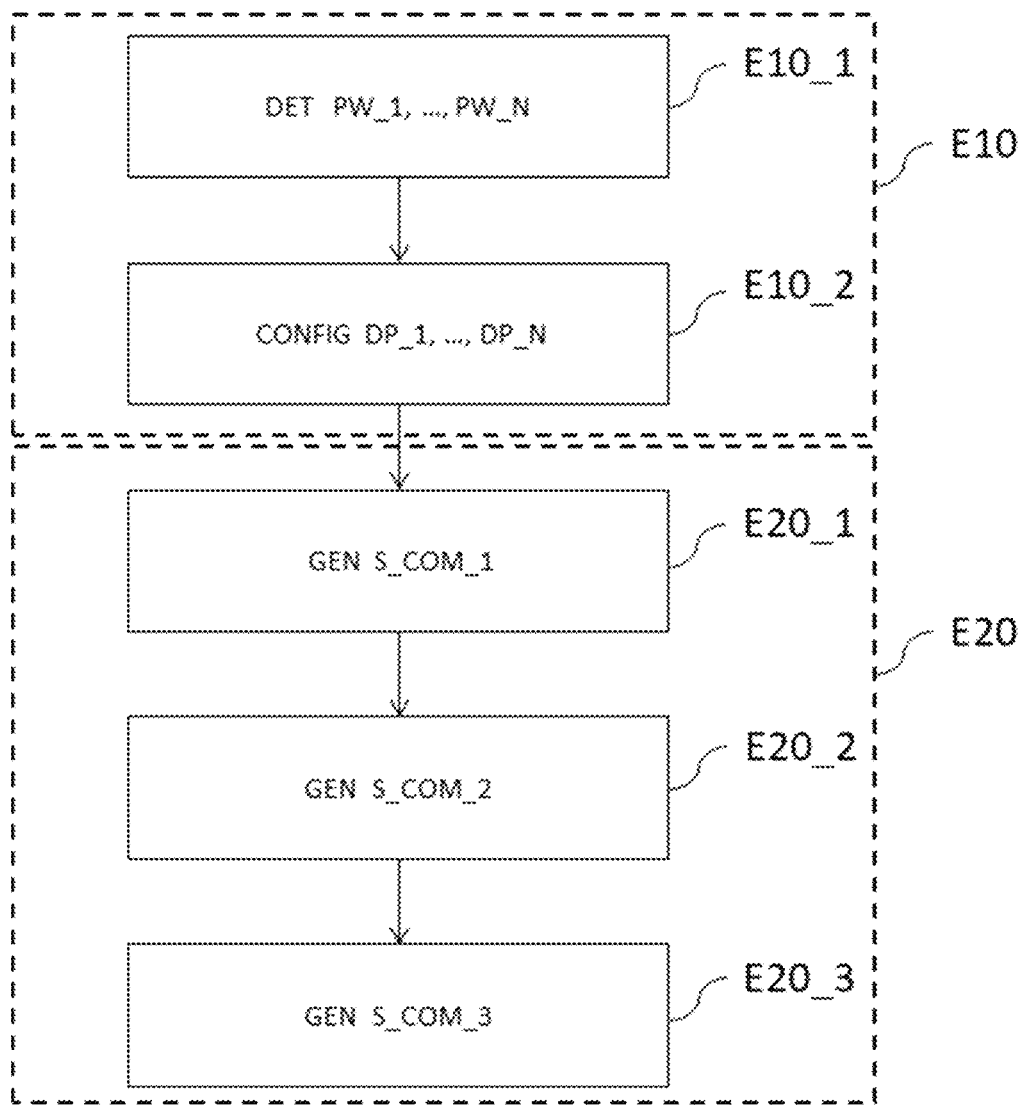

[Fig. 5]
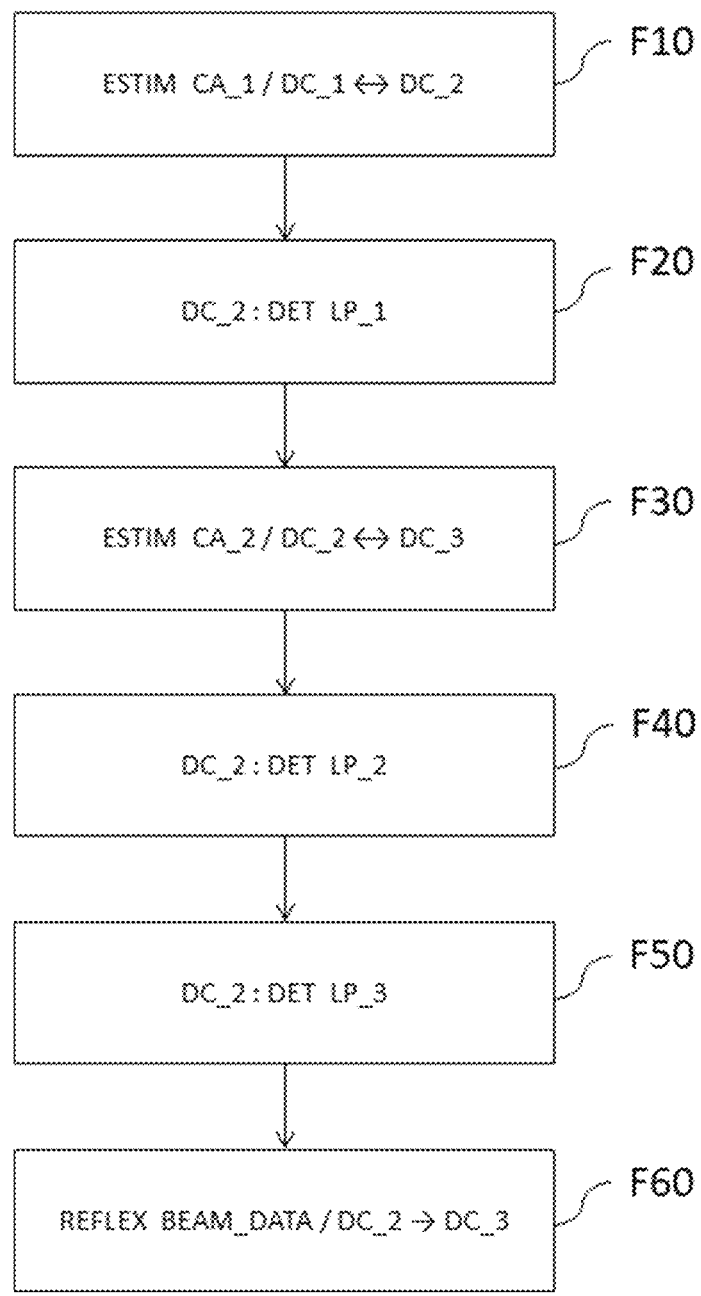

MULTI-ANTENNA WIRELESS COMMUNICATION DEVICE, METHOD FOR CONTROLLING SUCH A DEVICE

RELATED APPLICATIONS

This application is the U.S. National Phase of Application No. PCT/FR2021/050836 entitled "MULTI-ANTENNA WIRELESS COMMUNICATION DEVICE, METHOD FOR CONTROLLING SUCH A DEVICE" and filed May 12, 2021, which claims the benefit of French Patent Application No. 2005546, filed May 26, 2020, each of which is incorporated by reference in its entirety.

PRIOR ART

The present invention belongs to the general field of telecommunications, and in particular wireless communications implemented on radio-type networks such as mobile networks (e.g. 3G, 4G, 5G, etc.), Wi-Fi, etc. It relates more particularly to a wireless communication device including an array of antenna elements, said device having a hybrid analog-digital architecture configured to emit and receive transmission beams via said antenna elements. It also relates to a method for controlling the operation of such a device, as well as a communication method implemented by a wireless communication system including such a device.

The invention finds a particularly advantageous application, although without limitation, in the case of a wireless communication device of the MIMO (Multiple Input Multiple Output) type using several antennas in emission and in reception, and in particular in the case of a massive MIMO type wireless communication device based on a large number of antennas (typically from 16 to 128 antennas, this number being likely to increase in the future).

In order to adapt to the continuous and ever faster growth of the data traffic emitted by the wireless communication systems, different technologies are now being implemented, and are still being improved with a view to optimal use in the years to come.

Among these technologies, and more particularly in the context of MIMO-type wireless communication systems, it is known to configure a wireless communication device, such as a base station or a mobile telephone, for the purpose of simultaneously emitting and/or receiving several data streams via an array of antennas (i.e. a set of antenna elements) equipping said wireless communication device. Advantageously, these data streams are conveyed by directional transmission beams (also called beamforming) formed for this purpose. The use of such beams thus allows the wireless communication device to deliver or receive data with high spectral efficiency as well as with a high flow rate.

These performances can be further improved via the use of surfaces called "Intelligent Surfaces", which are often large-sized, as has been proposed recently.

In its general principle, such an intelligent surface is essentially composed of antennas connected to passive phase-shifters that are controlled to allow said antennas to reflect incident signals (e.g. transmission beams) in a preferred direction. Consequently, when such an intelligent surface is positioned in the environment of two wireless communication devices, one acting as an emitter and the other acting as a receiver, it allows increasing the flow rate between them by creating a propagation channel conducive to better reflection towards the receiving device that receives incident signals from the emitting device. Exemplary implementations of such an intelligent surface are for example described in the document: "Deep Learning for Large Intelligent Surfaces in Millimeter Wave and Massive MIMO Systems", A. Taha, M. Alrabeiah, A. Alkhateeb, Proc. IEEE Globecom 2019, 9-13 Dec. 2019, Hawaii, USA.

It should furthermore be noted that the use of an intelligent surface is particularly advantageous when an obstacle prevents, or at least complicates, the establishment of a communication between an emitting device and a receiving device. By way of illustration, it may be a wall positioned between these devices, an intelligent surface allowing them to communicate with each other by "bypassing" this wall.

However, the implementation of an intelligent surface remains problematic to this day, mainly for reasons of complexity and cost. Indeed, the effective controlling of a large number of passive phase-shifters turns out to be a difficult task, at least with regard to the electronics to be deployed as well as the algorithmic and signal processing aspects to be implemented. Furthermore, the fact of integrating an element (i.e. the intelligent surface) in addition to the elements initially forming a wireless communication system (i.e. emitting devices and receiving devices) requires significant expenditure, thus contributing to making the use of an intelligent surface an expensive communication solution.

DISCLOSURE OF THE INVENTION

The present invention aims to overcome all or part of the drawbacks of the prior art, in particular those set out above, by proposing a solution that allows improving the performances of a wireless communication system in a simpler and less expensive manner than the solutions of the prior art implementing an intelligent surface.

To this end, and according to a first aspect, the invention relates to a wireless communication device having a hybrid analog-digital architecture configured to emit and receive transmission beams via an array of antenna elements and including an analog processing unit comprising passive phase-shifters, each passive phase-shifter including a first port and a second port. Furthermore, said communication device includes a control module configured to control switching means of said communication device, so that the communication device is able to alternate between three distinct modes:
  a first/second mode in which each passive phase-shifter is integrated into an emission/reception chain connected to an antenna element,
  a third mode in which each passive phase-shifter is integrated into a transmission line separate from the emission and reception chains, said transmission line including a first part connecting the first port of said passive phase-shifter to the antenna element to which it can also be connected in said first/second modes and configured so that substantially all of the electromagnetic energy associated with a transmission beam received by said antenna element is transmitted to the passive phase-shifter, said transmission line also including a second part connecting the second port of said passive phase-shifter to an impedance configured to reflect said electromagnetic energy.

Thus, there is proposed a wireless communication device on the one hand having a hybrid analog-digital architecture, and on the other hand configured in software and hardware to reflect one or several transmission beams in a direction that can be controlled thanks to the passive phase-shifters.

The advantages proposed by a hybrid analog-digital architecture such as the one implemented by the invention, particularly in the context of the operation of a 5G network, consist in particular of a good cost/performance compromise (high flow rates and good network coverage in emission and reception) in comparison with an architecture that would rely entirely on a digital processing of the signals.

In general, those skilled in the art can refer to the following document for more details regarding the implementation of a hybrid analog-digital architecture: "An Overview of Signal Processing Techniques for Millimeter Wave MIMO Systems", R. W. Heath, N. Gonzalez-Prelcic, S. Rangan, W. Roh, A. M. Sayeed, IEEE Journal of Selected Topics in Signal Processing, vol. 10, no. 3, pp. 436-453, April 2016.

Conventionally, the passive phase-shifters implemented by the hybrid analog-digital architecture of the communication device according to the invention allow, depending on how they are configured, controlling the direction in which the transmission beams that can be emitted or received by the array of antenna elements are preferably oriented. However, the invention is not limited to such use of said passive phase-shifters.

Indeed, each passive phase-shifter is also used to allow connecting, according to said third operating mode of the wireless communication device, each antenna element to an impedance. In this manner, in this third operating mode, substantially all the energy transported by a signal and received at the level of an antenna element is firstly transmitted up to said impedance, then secondly reflected in the direction of said antenna element precisely because of the presence of said impedance.

Consequently, when the passive phase-shifters are configured in an appropriate manner, the communication device according to the invention behaves like an intelligent surface, since a signal received by the latter can be reflected in a chosen direction. Such dispositions allow the communication device according to the invention to improve any communications between other communication devices, as proposed by the intelligent surfaces (increase in the flow rate, circumvention of an obstacle).

The modifications to be envisaged to make a communication device according to the invention from a traditional device having a hybrid analog-digital architecture are also inexpensive. Indeed, the implementation of components such as impedances and appropriate switching means can be achieved at lower cost, these components being very easily accessible.

The invention is also particularly advantageous insofar as the communication device according to the invention can take the form of a piece of equipment already present in the environment of a communication network. By way of example, it can be a mobile terminal, a base station, etc. In other words, by configuring according to the dispositions of the invention a traditional communication device having a hybrid analog-digital architecture, it is not necessary to use, as done in the state of the art, intelligent surfaces that are costly and complex to implement.

Of course, the communication device remains capable of performing communications in a traditional manner (i.e. emission/reception of transmission beams within the framework of the first/second operating mode).

The invention therefore allows taking advantage of the advantages provided by a hybrid analog-digital architecture as well as by an intelligent surface, by avoiding the actual implementation of such a surface in a communication network. In this manner, the invention offers the possibility of improving the communications in a communication network, in a simple and inexpensive manner.

In particular embodiments, the wireless communication device may further include one or several of the following characteristics, taken in isolation or in all technically possible combinations.

In particular embodiments, the first part of the transmission line includes an impedance matching circuit.

Such an impedance matching circuit allows optimizing the transfer of electromagnetic energy along a transmission line. More particularly, such an impedance matching circuit can be designed so as to minimize local reflections, and therefore ultimately maximize the transfer of electromagnetic energy, between the antenna element and the passive phase-shifter associated therewith.

In particular embodiments, the control module is configured to implement the alternation between said three distinct modes according to a predetermined time scheme.

In particular embodiments, said predetermined time scheme is compliant with a telecommunications standard.

In particular embodiments, the control module is configured to implement the alternation between said three distinct modes according to a dynamic time scheme.

According to a second aspect, the invention relates to a wireless communication system including:
  a first wireless communication device configured to emit at least one transmission beam,
  a second wireless communication device according to the invention, able to reflect at least one of said transmission beams in a determined direction when it is configured according to said third mode,
  a third wireless communication device configured to receive said at least one transmission beam reflected by said second communication device.

According to a third aspect, the invention relates to a method for controlling the operation of a wireless communication device according to the invention, said control method being implemented by the control module of said wireless communication device, and in which the first and second switching means are controlled such that said wireless communication device alternates between said three distinct modes.

The control method according to the invention therefore inherits the advantages provided by the communication device according to the invention, the control module therefore making it possible to configure this device in the mode that allows it to reflect one or several transmission beams in a given direction thanks to the passive phase-shifters.

According to a fourth aspect, the invention relates to a computer program including instructions for the implementation of a control method according to the invention when said program is executed by a computer.

This program can use any programming language, and be in the form of source code, object code, or intermediate code between source code and object code, such as in partially compiled form, or in no any other desirable form.

According to a fifth aspect, the invention relates to a computer-readable information or recording medium on which a computer program according to the invention is recorded.

The information or recording medium can be any entity or device capable of storing the program. For example, the medium can include a storage means, such as a ROM, for example a CD ROM or a microelectronic circuit ROM, or even a magnetic recording medium, for example a floppy disk or a hard disk.

On the other hand, the information or recording medium can be a transmissible medium such as an electrical or optical signal, which can be routed via an electrical or optical cable, by radio or by other means. The program according to the invention can be particularly downloaded from an Internet-type network.

Alternatively, the information or recording medium can be an integrated circuit in which the program is incorporated, the circuit being adapted to execute or to be used in the execution of the method in question.

According to a sixth aspect, the invention relates to a communication method implemented by a wireless communication system according to the invention, in which at least one transmission beam emitted by the first communication device is reflected by the second communication device when said second communication device is in said third mode and received by the third communication device.

In particular modes of implementation, said communication method includes steps of:
- estimating a first propagation channel between the first and second communication devices,
- determining, by the second communication device and according to the estimation of the first propagation channel, a first phase law able to configure the passive phase-shifters in the direction of the first communication device,
- estimating a second propagation channel between the second and third communication devices,
- determining, by the second communication device and according to the estimation of the second propagation channel, a second phase law able to configure the passive phase-shifters in the direction of said third communication device,
- determining, by the second communication device, a third phase law, said third phase law being equal to the Hadamard product of said first phase law by said second phase law,
- reflecting, by the second communication device configured in said third mode and using said third phase law, said at least one transmission beam towards the third communication device.

BRIEF DESCRIPTION OF THE DRAWINGS

Other characteristics and advantages of the present invention will become apparent from the description given below, with reference to the appended drawings which illustrate an exemplary embodiment devoid of any limitation. In the figures:

FIG. 1 schematically represents, in its environment, one particular embodiment of a communication system according to the invention;

FIG. 2 schematically represents one example of hardware architecture of a wireless communication device according to the invention belonging to the communication system of FIG. 1;

FIG. 3 schematically represents one example of hardware architecture of a control device according to the invention equipping the wireless communication device of FIG. 2 and configured to implement a control method;

FIG. 4 represents, in the form of a flowchart, one particular exemplary implementation of the control method according to the invention;

FIG. 5 represents, in the form of a flowchart, one particular exemplary implementation of a communication method according to the invention.

DESCRIPTION OF THE EMBODIMENTS

FIG. 1 schematically represents, in its environment, one particular embodiment of a wireless communication system 10 according to the invention.

The wireless communications system 10 is a multi-antenna or MIMO system. As illustrated in FIG. 1, this system 10 includes a first wireless communication device DC_1, a second communication device DC_2 according to the invention as well as a third communication device DC_3.

In the present embodiment, and for the purpose of simplifying the description, it is considered that the communication system 10 includes only said communication devices DC_1, DC_2 and DC_3. It should however be noted that no limitation is attached to the number of communication devices (including in particular communication devices according to the invention) that can be considered within the framework of the present invention. The following developments can indeed be generalized without difficulty by those skilled in the art in the event that more than three wireless communication devices (including a plurality of communication devices according to the invention) are considered.

The second wireless communication device DC_2 includes a plurality of antenna elements (not represented in FIG. 1) organized in the form of an array of antennas and configured to emit and receive beams, these serving as a support for the simultaneous transmission of several data streams to serve one or several determined portions of space. Such beams are called "transmission beams" in the remainder of the description. It should be noted that the number of antennas equipping the communication device DC_2 does not constitute a limiting factor of the invention, as long as this number is greater than 2.

Each communication device DC_1, DC_3 is equipped with at least one antenna. No limitation is attached to the number of antennas equipping each of said communication devices DC_1, DC_3.

In this manner, the communication device DC_2 is able to communicate with the communication devices DC_1 and DC_3. Of course, nothing excludes envisaging that the communication devices DC_1 and DC_3 can communicate directly with each other.

The communication devices DC_1, DC_2 and DC_3 belong to a wireless communications network (not represented in FIG. 1). For the remainder of the description, it is considered in a non-limiting manner that said telecommunications network is a mobile network of the 5G type.

It should however be specified that the invention remains applicable to other types of telecommunications network, such as a 4G, 3G, Wi-Fi, etc. mobile network. In general, no limitation is attached to the nature of the telecommunications network that can be considered within the framework of the present invention.

It should also be noted that the invention is applicable regardless of the nature of said communication devices DC_1, DC_2 and DC_3, as long as these are capable of performing wireless communications. Thus, nothing excludes considering that at least one of the communication devices is a mobile terminal, such as a laptop computer, a personal assistant, a connected object, a mobile phone of the smartphone type, etc. and that at least one other of said communication devices is a base station. Also, nothing excludes considering that the communication devices DC_1, DC_2 and DC_3 are all three mobile terminals or all three base stations.

FIG. 2 schematically represents an example of hardware architecture of the second wireless device DC_2 according to the invention belonging to the communication system 10 of FIG. 1.

The communication device DC_2 has a hybrid analog-digital architecture configured to emit and receive transmission beams via said antenna elements A_1, ..., A_N, N being an integer index strictly greater than 1. In the example of FIG. 2, and for the purpose of simplifying it, the number N of antenna elements is considered equal to 8.

The advantages proposed by such a hybrid analog-digital architecture, particularly in the context of the operation of a 5G network as considered here, consist in particular of a good cost/performance compromise in comparison with an architecture that would rely entirely on a digital processing of the signals.

Conventionally, said hybrid analog-digital architecture is based, in particular, on the combination between a digital processing unit called a DSP (Digital Signal Processing) unit and an analog processing unit called ANA unit.

The communication device DC_2 also includes a plurality of RF (Radio Frequency) emission chains as well as a plurality of RF reception chains.

Each emission chain includes a part called "inner" part comprising a digital-analog converter 101 and a modulator 102 arranged between the DSP unit and the ANA unit, as well as a part called "outer" part comprising a power amplifier 103 arranged between an antenna element and the ANA unit. Similarly, each reception chain includes a part called "outer" part comprising a low-noise amplifier 104 arranged between an antenna element and the ANA unit, as well as a part called "inner" part comprising a demodulator 105 and an analog-to-analog converter 106 arranged between the DSP unit and the ANA unit.

Of course, an emission chain (respectively a reception chain), regardless of the considered inner or outer part, can also include other electronic pieces of equipment (filters, etc.), this aspect not being described further here because it is outside the framework of the invention.

In the present exemplary embodiment illustrated in FIG. 2, the communication device DC_2 includes as many emission chains as reception chains. It should however be noted that the choice consisting in considering a number of emission chains equal to the number of reception chains only constitutes one variant of embodiment of the invention. Thus, nothing excludes envisaging that these numbers differ from each other. More generally, no limitation is attached to the number of emission chains as well as to the number of reception chains that can be considered within the framework of the present invention as long as the communication device DC_2 is capable of emitting and receiving transmission beams. Those skilled in the art know how to adapt the following description according to the respective numbers of these chains, particularly concerning the aspects related to the switching means described in detail below.

Said DSP unit is configured to perform processings aimed to generate baseband signals intended to be routed towards the array of antennas A_1, ..., A_N via said emission chains, as well as to process signals received by said network of antennas A_1, ..., A_N and which are routed to it via the reception chains.

For this purpose, the DSP unit includes for example one or several processors and storage means (magnetic hard disk, electronic memory, optical disk, etc.) in which data and a computer program are stored, in the form of a set of program code instructions to be executed in order to implement the aforementioned signal processings.

Alternatively or additionally, the DSP unit also includes one or several programmable logic circuits, of the FPGA, PLD, etc. type, and/or specific integrated circuits (ASIC), and/or a set of discrete electronic components, etc adapted to implement said signal processings.

In other words, the DSP unit includes a set of means configured in software (specific computer program) and/or in hardware (FPGA, PLD, ASIC, etc.) to implement said signal processings.

The analog processing unit ANA, for its part, is separated from the DSP unit by the inner parts of said emission and reception chains. It includes passive phase-shifters DP_1, ..., DP_N arranged so as to connect, in particular via switching means described later, the outer parts of the emission and reception chains (and therefore ultimately the antenna elements A_1, ..., A_N) to the inner parts of said emission and reception chains.

Said passive phase-shifters are of a design known per se and are configured to assign weights to analog signals, in an adjusted and adaptive manner with a view to the emission or reception of transmission beams by the network of the antenna elements A_1, ..., A_N, for example to form part of a given communication strategy. By way of illustration, such a strategy can consist in maximizing the power of the signal received at the level of one or several receiving terminals, such as for example the communication device DC_3.

For more details regarding the implementation of a hybrid analog-digital architecture, those skilled in the art can refer to the document by R. W. Heath et al. already mentioned above.

Conventionally, the hybrid analog-digital architecture of the communication device DC_2 is configured so that a passive phase-shifter DP_i (i being an integer index between 1 and N) can be connected to an antenna A_i. To this end, each passive phase-shifter DP_i includes a first port PO_i_1 and a second port PO_i_2. Said first port PO_i_1 is intended to be connected to the antenna A_i which is associated therewith through the outer part of an emission chain or the outer part of a reception chain. The second port PO_i_2, for its part, is intended to be connected to the inner part of an emission chain or a reception chain.

In accordance with the invention, the ANA unit also includes impedances U_1, ..., U_N. Furthermore, the second port PO_i_2 of a passive phase-shifter DP_i can also be connected to one of said impedances U_i as described in detail later (each passive phase-shifter can thus be connected to a single impedance, it being understood that there are as many impedances as passive phase-shifters).

As illustrated in FIG. 2, the ANA unit also includes dividers DIV_1, ..., DIV_P (P being an integer index strictly greater than 1) that allows connecting a set formed of two passive phase-shifters to the inner part of an emission chain or a reception chain. It is therefore understood that it is the second ports of the phase-shifters belonging to such a set that are connected to a divider. In other words, in this exemplary embodiment, there are twice as many antenna elements as there are dividers (i.e. P is equal to N/2).

However, and in accordance with what has already been mentioned above (no limitation as to the number of emission and reception chains), nothing excludes, according to other examples not detailed here, having one or several dividers able to connect sets formed of more than two dividers to an emission chain or to a reception chain. Moreover, nothing excludes either envisaging that no divisor is used. In general, these aspects are not a limiting factor of the invention.

The communication device DC_2 includes several switching means. Thus, and firstly, said device DC_2 includes, for each passive phase-shifter DP_i, first switching means configurable according to three states.

For the remainder of the description, it is considered with no limitation that said first switching means associated with a passive phase-shifter DP_i are multi-way switches 110_k (k being an integer index comprised between 1 and 4) able to be controlled by appropriate control signals to move from one position to another position, said three states being defined by given positions of said switches 110_k. It should however be noted that no limitation is attached to the nature of said first switching means as long as they can be configured according to said three states described hereafter.

The first of said three states associated with the first switching means is a state called "emission" state in which the antenna element A_i associated with said passive phase-shifter DP_i is connected to the first port PO_i_1 of the latter to emit transmission beams.

By way of non-limiting example, and as illustrated by FIG. 2, the implementation of this emission state is achieved thanks to:
- a switch 110_1 connected to the first port PO_i_1 of the considered passive phase-shifter DP_i. It is noted that by "connected switch", reference is made here to the fact that a given way of said switch 110_1 is connected to said first port PO_i_1. This switch 110_1 is configured in a first position in which said first port PO_i_1 is connected to the power amplifier 103 associated with the antenna element A_i;
- a switch 110_2 connected to said antenna element A_i, and configured in a first position in which said power amplifier 103 is connected to said antenna element A_i;
- a switch 110_3 connected to the divider associated with the considered passive phase-shifter DP_i, and configured in a first position in which said divider is connected to the inner part of the emission chain to which the power amplifier 103 associated with the antenna element A_i belongs;
- a switch 110_4 connected to the DSP unit, and configured in a first position in which said inner part is connected to said DSP unit.

It should be noted that the passive phase-shifters connected to the same divider are connected to the same switch 110_3.

The second of said three states associated with the first switching means is a state called "reception" state in which the antenna element A_i associated with said passive phase-shifter DP_i is connected to the first port PO_i_1 of the latter to receive transmission beams.

In the example of FIG. 2, the implementation of this reception state is achieved in the following manner:
- said switch 110_1 is configured in a second position in which said first port PO_i_1 is connected to the low-noise amplifier 104 associated with the antenna element A_i;
- said switch 110_2 is configured in a second position in which said low-noise amplifier 104 is connected to said antenna element A_i;
- said switch 110_3 is configured in a second position in which said divider is connected to the inner part of the reception chain to which the low-noise amplifier 104 associated with the antenna element A_i belongs;
- said switch 110_4 is configured in a second position in which said inner part is connected to said DSP unit.

The third of said three states associated with the first switching means is a state called "reflection A" state in which the antenna element A_i associated with the considered phase-shifter DP_i is connected to the first port PO_i_1 of said passive phase-shifter DP_i via a first part of a transmission line. This transmission line is distinct from the emission chain (respectively from the reception chain) including the power amplifier 103 (respectively the low-noise amplifier 104) to which the first port PO_i_1 of the passive phase-shifter DP_i can be connected.

Furthermore, said first part of the transmission line is configured so that substantially all the electromagnetic energy associated with a transmission beam received by said antenna element A_i is transmitted to the passive phase-shifter DP_i and is intended to be reflected.

In order to allow such a transmission of energy, and as illustrated in FIG. 2, said first part of the transmission line includes for example an impedance matching circuit CIR_Z. In this case, and with reference to FIG. 2, the reflection state A refers to the following configuration:
- said switch 110_1 is configured in a third position in which said first port PO_i_1 is connected to the circuit CIR_Z;
- said switch 110_2 is configured in a third position in which said antenna element A_i is connected to the circuit CIR_Z;
- the respective positions of the switches 110_3 and 110_4 are arbitrary.

Such an impedance matching circuit CIR_Z typically allows optimizing the transfer of electromagnetic energy along a transmission line. More particularly, such an impedance matching circuit CIR_Z can be designed so as to minimize the local reflections, and therefore ultimately to maximize the transfer of electromagnetic energy, between the antenna element A_i and the passive phase-shifter DP_i associated therewith.

Said impedance matching circuit CIR_Z can include different electronic components such as capacitors, inductors, resistors, etc., and more broadly any electronic component having an impedance of its own. In general, the design and the implementation of such an impedance matching circuit CIR_Z are known to those skilled in the art, so that this aspect is not described further here.

In the exemplary embodiment illustrated in FIG. 2, the matching impedance circuits CIR_Z which can be respectively connected to the antennas A_1, . . . , A_N are all identical to each other. However, nothing excludes envisaging that at least two impedance matching circuits differ from each other, depending in particular on the characteristic impedances of the passive phase-shifters and of the antennas that these at least two impedance matching circuits are intended to connect with each other in the reflection state A.

It should be noted that the invention is not limited to the implementation of an impedance matching circuit so that substantially all the electromagnetic energy associated with a beam received by said antenna element is transmitted to the passive phase-shifter. Indeed, such energy transmission depends above all on the characteristic impedances of the passive phase-shifter DP_i and of the antenna element A_i which is associated therewith.

Thus, nothing excludes envisaging one example in which said energy transmission takes place along a transmission line forming a short circuit between said passive phase-shifter DP_i and said antenna element A_i. Then the reflection state A refers to the following configuration:
- said switch 110_1 is configured in a third position in which said first port PO_i_1 is connected to one end of the transmission line forming a short circuit;
- said switch 110_2 is configured in a third position in which said antenna element A_i is connected to the other end of said transmission line forming a short circuit;
- the respective positions of the switches 110_3 and 110_4 are arbitrary.

Furthermore, and secondly, said device DC_2 includes, for each passive phase-shifter DP_i, second switching means integrated into said ANA unit and configurable according to two states.

For the remainder of the description, it is considered without limitation that said second switching means are a multi-way switch 111 able to be controlled by appropriate control signals to move from one position to another position, said two states being defined by given positions of said switch 111. It should however be noted that no limitation is attached to the nature of said second switching means as long as they can be configured according to said two states described hereafter.

The first of said two states associated with the second switching means is a state called "transmission" state in which the second port PO_i_2 of the considered passive phase-shifter DP_i is connected to an emission chain or a reception chain (more particularly to the inner part of such a chain).

In the example of FIG. 2, the implementation of this transmission state is achieved thanks to the switch 111 which is connected (i.e. a given way of which is connected) to the second port PO_i_2 of the passive phase-shifter DP_i. This switch 111 is configured in a first position in which said second port PO_i_2 is connected to the divider associated with said passive phase-shifter DP_i. In this manner, said passive phase-shifter DP_i is connected to the inner part of an emission or reception chain.

The second of said two states associated with the second switching means is a state called "reflection B" state in which the second port PO_i_2 of the considered passive phase-shifter DP_i is connected to one of said impedances U_i via a second part of the transmission line to which belongs the first part able to connect the first port PO_i_1 of the passive phase-shifter DP_i to the antenna element A_i when the first switching means are in the reflection state A.

Said impedance U_i is configured so as to reflect the electromagnetic energy that said passive phase-shifter DP_i is capable of routing to it when the first switching means are in the reflection state A. For example, such an impedance U_i is obtained through a short circuit or an open circuit, so as to maximize the reflected energy. It is also noted that the impedances U_i can for example all be identical to each other.

In the example of FIG. 2, the implementation of this reflection state B is achieved thanks to the switch 111 which is connected to the second port PO_i_2 of the passive phase-shifter DP_i. This switch 111 is configured in a second position in which said second port PO_i_2 is connected to said impedance U_i via said second part of the transmission line.

In addition, the second communication device DC_2 includes a control device D_CO configured to implement processings aimed at allowing the second communication device DC_2 to reflect one or several transmission beams received at the level of the antenna elements A_1, A_n, by implementing a method for controlling the operation of said device DC_2.

For the remainder of the description, it is considered without limitation that the control device D_CO forms a separate hardware element, physically integrated into the second communication device DC_2. The invention nevertheless remains applicable in the case where the control device D_CO is external (i.e. is not physically integrated) to the second communication device DC_2, or even in the case where said second communication device DC_2 and the control device D_CO are combined.

FIG. 3 schematically represents an example of hardware architecture of the control device D_CO according to the invention configured to implement said control method.

As illustrated in FIG. 3, the control device D_CO according to the invention has the hardware architecture of a computer. Thus, such a control device D_CO includes, in particular, a processor 1, a random access memory 2, a read only memory 3 and a non-volatile memory 4. It also has a communication module 5.

The communication module 5 in particular allows the control device D_CO to transmit control signals to the first and second switching means. This communication module 5 includes for example a computer data bus able to transmit said control signals. According to another example, the communication means 5 include a wired or wireless communication interface able to implement any suitable protocol known to those skilled in the art (Ethernet, Wi-fi, Bluetooth, 3G, 4G, 5G, etc.).

The read only memory 3 of the control device D_CO constitutes a recording medium in accordance with the invention, readable by the processor 1 and on which a computer program PROG in accordance with the invention is recorded, including instructions for the execution of steps of the control method according to the invention. The program PROG more particularly defines a functional module called "control module MOD_CO" of the control device D_CO. This control module MOD_CO is configured to control, based on the hardware elements 2 to 5 of the control device D_CO mentioned above, said first and second switching means associated with the set of the passive phase-shifters DP_1, . . . , DP_N, so that the second communication device DC_2 is able to alternate between three distinct modes.

The first of said three distinct modes is a mode in which, for each passive phase-shifter DP_i, the first switching means are in the emission state and the second switching means are in the transmission state. In other words, in this first mode, each passive phase-shifter DP_i is integrated into an emission chain, and the second communication device DC_2 is configured to emit one or several transmission beams by means of the emission chains into which the passive phase-shifters DP_1, . . . , DP_N are integrated.

With reference to FIG. 2, the implementation of this first mode is achieved as follows:
- the switches 110_1, 110_2, 110_3 and 110_4 are in their respective first positions,
- the switch 111 is in its first position.

The second of said three distinct modes is a mode in which, for each passive phase-shifter DP_i, the first switching means are in the reception state and the second switching means are in the transmission state. In other words, in this second mode, each passive phase-shifter DP_i is integrated into a reception chain, and the second communication device DC_2 is configured to receive one or several transmission beams by means of the reception chains into which the passive phase-shifters DP_1, . . . , DP_N are integrated.

Referring to FIG. 2, the implementation of this second mode is achieved as follows:
- the switches 110_1, 110_2, 110_3 and 110_4 are in their respective second positions,
- the switch 111 is in its first position.

Finally, the third of said three distinct modes is a mode in which, for each passive phase-shifter DP_i, the first switching means are in the reflection state A and the second switching means are in the reflection state B. In other words, in this third mode, each passive phase-shifter DP_i is integrated into the transmission line associated therewith, and the second communication device DC_2 is configured to reflect one or several transmission beams in a direction determined by the configuration of the passive phase-shifters (i.e. in a direction determined according to the weights associated with the passive phase-shifters).

Referring to FIG. 2, the implementation of this third mode is achieved as follows:
- the switches 110_1, 110_2 are in their respective third positions,
- the switch 111 is in its second position,
- the switches 110_3, 110_4 are in any position (i.e. first or second position).

In this exemplary embodiment, it is considered that the control module MOD_CO is also configured to determine the weights that should be assigned to the different passive phase-shifters DP_1, . . . , DP_N, but also to control them according to the weights that have been determined.

However, nothing excludes envisaging, according to other examples not detailed here, that the control module MOD_CO is only configured to control the first and second switching means, so that the device DC_2 is able to alternate between three distinct modes, and that another control module of said device DC_2 is for its part configured to determine the weights to be assigned to the passive phase-shifters DP_1, . . . , DP_N as well as to control them according to the weights that have been determined.

The controlling of the operation of the second communication device DC_2, implemented by the control module MOD_CO, therefore allows alternating between the three modes of the device DC_2. The fact of allowing the device DC_2 to operate according to said third mode is particularly advantageous. Indeed, when the passive phase-shifters are configured in an appropriate manner, this gives the possibility of improving any communications between the first communication device DC_1 and the third communication device DC_3 of the system 10, the second communication device DC_2 thus playing the role of an intelligent surface.

This is advantageous insofar as the second communication device DC_2 can correspond to a piece of equipment already present in the environment of said first and third communication devices. In other words, by configuring according to the invention a traditional communication device (mobile terminal, base station, etc.) having a hybrid analog-digital architecture, it is not necessary to use, as done in the state of the art, intelligent surfaces that are expensive and complex to implement.

In a more particular embodiment, the control module MOD_CO is configured to implement the alternation between said three distinct modes according to a predetermined time scheme.

By "predetermined time scheme", reference is made here to the fact that predetermined time periods are allocated to each of said three modes, the controlling of the operation of the second communication device DC_2 being carried out so that these time periods are met.

By way of non-limiting example, said predetermined time scheme is compliant with a telecommunications standard.

According to another example, or possibly according to one particular implementation of a telecommunications standard, the predetermined time scheme includes:
- a first time period during the day during which the second communication device DC_2 only alternates between the first and second modes,
- a second time period during the night during which the second communication device DC_2 operates only according to said third mode, the respective durations of said first and second time periods being able for example to be fixed by an operator in charge of operating the telecommunications network.

In general, no limitation is attached to the duration and to the number of said time periods, and therefore ultimately to the structure of said predetermined time scheme. Furthermore, it is of course understood that such a predetermined time scheme is not only known to the second communication device DC_2, but also to the first and third communication devices DC_1, DC_3, so that all these devices can communicate with each other in a coordinate manner.

Alternatively, the control module MOD_CO is configured to implement the alternation between said three distinct modes according to a dynamic time scheme.

By "dynamic time scheme", reference is made here to a time scheme according to which the alternation between the three operating modes of the second communication device DC_2 takes place according to time periods that are not predetermined. In other words, the alternation between the three modes can be done freely, on the fly.

For example, signaling messages can be exchanged dynamically between the communication devices DC_1, DC_2 and DC_3. These messages are configured so that once received by the second communication device DC_2 (respectively by the first and third communication devices DC_1, DC_3), the latter knows in which mode it must operate (respectively the first and third communication devices know in which mode the second communication device DC_2 is configured).

FIG. 4 represents, in the form of a flowchart, a particular example of implementation of the control method according to the invention.

In this particular exemplary implementation, it is considered that the alternation between the three distinct modes associated with the second communication device DC_2 takes place according to a predetermined time scheme, and that furthermore a time period during which said device DC_2 is intended to reflect one or several transmission beams (third mode) in a given direction begins.

It is also considered that before the beginning of this time period, said second communication device DC_2 is configured in the first mode (i.e. first switching means in the emission state and second switching means in the transmission state).

Therefore, when said time period begins, the control method includes a step E10 of configuring passive phase-shifters DP_1, . . . , DP_N.

To this end, step E10 firstly comprises, for each passive phase-shifter DP_i, a determination (sub-step E10_1) of a weight PW_i as a function of said direction in which the beam(s) are intended to be reflected.

Then, step E10 secondly comprises a configuration (sub-step E10_2) of the passive phase-shifters DP_1, . . . , DP_N according to the weights PW_1, . . . , PW_N which are respectively assigned to them. For this purpose, the control module MOD_CO generates appropriate control signals, these control signals being transmitted to the passive phase-shifters DP_1, . . . , DP_N.

Subsequently, the control method includes a step E20 of controlling the first and second switching means so that the second communication device DC_2 moves from the first mode to the third mode.

For this purpose, the control module MOD_CO generates control signals for said first and second switching means. More particularly, and with reference to FIG. 2:

a first control signal S_COM_1 is generated (sub-step E20_1) to move the switch 110_1 from its first position to its third position;

a second control signal S_COM_2 is generated (sub-step E20_2) to move the switch 110_2 from its first position to its third position;

a third control signal S_COM_3 is generated (sub-step E20_3) to move the switch 111 from its first position to its second position.

Of course, the exemplary implementation of FIG. 4 is given here for purely illustrative purposes, the control method according to the invention not being limited in any way to a passage from the first mode to the third mode. Thus, any sequence formed by passages from a given mode to another given mode can be envisaged. Furthermore, the control method is no longer limited to the sole implementation of a reflection of one or several transmission beams by the second communication device DC_2. Particularly, given the hardware configuration of the communication device DC_2, nothing excludes that it emits or receives data in a conventional manner (i.e. by means of its emission/reception chains) when it is configured according to the first mode or to the second mode. The control method according to the invention can therefore include other control steps and/or configuration steps so as to allow such conventional data emission/reception.

The control method has been described above without explicitly referring to a communication between the communication devices DC_1, DC_2 and DC_3 forming the system 10. It is however important to note that the invention also relates to a communication method implemented by the wireless communication system 10 of FIG. 1, in which at least one transmission beam emitted by the first communication device DC_1 is reflected by the second communication device DC_2 when said second communication device DC_2 is in said third mode and received by the third communication device DC_3 (such a reflection is represented by way of illustration by means of dotted arrows in FIG. 1).

It is of course understood that the second communication device DC_2 alternates between different modes during the communication method. In other words, the control method described above is itself implemented implicitly during the execution of the communication method.

FIG. 5 represents, in the form of a flowchart, a particular exemplary implementation of the communication method according to the invention.

In the example of FIG. 5, the communication method including a step F10 of estimating a first propagation channel CA_1 between the first and second communication devices DC_1, DC_2.

Said step F10 is implemented in a manner known per se by said first and second communication devices DC_1, DC_2. For example, the first communication device DC_1 transmits to said second communication device DC_2 messages containing pilot symbols that allow making the estimation of said first channel. Also, in this example, the second communication device DC_2 is in the second mode.

The communication method also includes a step F20 of determining, by the second communication device DC_2 and based on the estimation of the first propagation channel CA_1, a first phase law LP_1 able to configure the passive phase-shifters DP_1, ..., DP_N in the direction of the first communication device DC_1.

Such a phase law LP_1 corresponding to a set of weights (a matrix of weights) intended to be assigned to the passive phase-shifters DP_1, ..., DP_N in order to configure them in the direction of the first communication device DC_1.

The communication method also including a step F30 of estimating a second propagation channel CA_2 between the second and third communication devices DC_2, DC_3.

The communication method also includes a step F40 of determining, by the second communication device DC_2 and based on the estimation of the second propagation channel CA_2, a second phase law LP_2 able to configure the passive phase-shifters DP_1, ..., DP_N in the direction of the third communication device DC_3.

Said steps F30 and F40 are implemented similarly to steps F10 and F20 respectively.

Then, the communication method includes a step F50 of determining, by the second communication device DC_2, a third phase law LP_3, said third phase law LP_3 being equal to the Hadamard product of said first phase law LP_1 by said second phase law LP_2.

The fact that the third phase law LP_3 is determined to be equal to said Hadamard product implies that it is able to configure the passive phase-shifters DP_1, ..., DP_N so that the second communication device DC_2 can reflect a transmission beam emitted by the first communication device DC_1 towards the third communication device DC_3 (i.e. said transmission beam emitted by the device DC_1 is effectively captured by the device DC_2 and reflected by the latter towards the device DC_3).

The choice according to which the third phase law LP_3 corresponds to the Hadamard product of the law LP_1 by the law LP_2 however constitutes only one variant of implementation of the invention. Thus, other examples can be envisaged such as for example a combination between the laws LP_1 and LP_2 which corresponds to an approximation of the Hadamard product.

Finally, in this exemplary implementation, the communication method includes a step F60 of reflecting, by the second communication device DC_2, configured in said third mode and using said third law phase LP_3, at least one transmission beam BEAM_DATA to the third communication device DC_3.

The exemplary implementation of the communication method of FIG. 5 has been described considering that the steps of estimating the first and second propagation channels CA_1, CA_2 (steps F10 and F30), as well as the steps of determining the first, second and third phase laws LP_1, LP_2 and LP_3 (steps F20, F40 and F50) were implemented by the second communication device DC_2. However, the invention also covers the case where at least one of these steps is implemented by processing means distinct from the communication devices and configured to carry out digital simulations based on which the estimation and/or the determination concerned is obtained.

Furthermore, and similarly to what was mentioned previously within the framework of the control method, the communication method according to the invention not only covers the case where the communication devices DC_1, DC_2 and DC_3 communicate with each other by reflection of at least one data beam, but also the cases where these exchange data with each other in a conventional manner (i.e. by means of their respective emission/reception chains).

Finally, the invention has been described so far by considering that only the second communication device DC_2 was in accordance with the invention. It goes without saying that the invention remains applicable if the first communication device DC_1 and/or the third communication device DC_3 is/are also in accordance with the invention.

The invention claimed is:

1. A wireless communication device having a hybrid analog-digital architecture configured to emit and receive transmission beams via an array of antenna elements and including an analog processing unit comprising passive phase-shifters, each passive phase-shifter including a first port and a second port, said communication device comprising a control module configured to control switching means of said communication device, so that the device is able to alternate between three distinct modes:
a first mode in which each passive phase-shifter is integrated into an emission chain connected to an antenna element,
a second mode in which each passive phase-shifter is integrated into a reception chain connected to an antenna element, and
a third mode in which each passive phase-shifter is integrated into a transmission line separate from the emission and reception chains, said transmission line including a first part connecting the first port of said passive phase-shifter to the antenna element to which it can also be connected in said first and second modes and configured so that substantially all of the electromagnetic energy associated with a transmission beam received by said antenna element is transmitted to the passive phase-shifter, said transmission line further including a second part connecting the second port of said passive phase-shifter to an impedance configured to reflect said electromagnetic energy.

2. The device of claim 1, wherein the first part of the transmission line includes an impedance matching circuit.

3. The device of claim 1, wherein the control module is configured to control the switching means so that the device alternates between said three distinct modes according to a predetermined time scheme.

4. The device of claim 3, wherein said predetermined time scheme is compliant with a telecommunications standard.

5. The device of claim 1, wherein the control module (MOD_CO) is configured to control the switching means so that the device alternates between said three distinct modes according to a dynamic time scheme.

6. A wireless communication system including:
a first wireless communication device configured to emit at least one transmission beam,
the second wireless communication device of claim 1, able to reflect said at least one transmission beam in a determined direction when it is configured according to said third mode, and
a third wireless communication device configured to receive said at least one transmission beam reflected by said second communication device.

7. A method for controlling the operation of the second wireless communication device of claim 1, said control method being implemented by the control module of said wireless communication device, the method comprising controlling the switching means such that said wireless communication device alternates between said three distinct modes.

8. A communication method implemented by the wireless communication system of claim 6, wherein at least one transmission beam emitted by the first communication device is reflected by the second communication device when said second communication device is in said third mode to be received by the third communication device.

9. The method of claim 8, said method comprising:
estimating a first propagation channel between the first and second communication devices,
determining, by the second communication device and according to the estimation of the first propagation channel, a first phase law able to configure the passive phase-shifters in the direction of the first communication device,
estimating a second propagation channel between the second and third communication devices,
determining, by the second communication device and according to the estimation of the second propagation channel, a second phase law able to configure the passive phase-shifters in the direction of said third communication device,
determining, by the second communication device, a third phase law, said third phase law being equal to the Hadamard product of said first phase law by said second phase law,
reflecting, by the second communication device configured in said third mode and using said third phase law, said at least one transmission beam towards the third communication device.

* * * * *